(12) United States Patent
Nasr et al.

(10) Patent No.: US 8,748,556 B2
(45) Date of Patent: Jun. 10, 2014

(54) SELF-SUPPORTING DYNAMIC POLYMER MEMBRANE, AND USES

(75) Inventors: Gihane Nasr, Montpellier (FR); Mihail-Dumitru Barboiu, Montpellier (FR); Christophe Charmette, Montpellier (FR); José Gregorio Sanchez Marcano, Sussargues (FR)

(73) Assignee: Centre National de la Recherche Scientifique, Paris (FR)

( * ) Notice: Subject to any disclaimer, the term of this patent is extended or adjusted under 35 U.S.C. 154(b) by 313 days.

(21) Appl. No.: 13/258,632

(22) PCT Filed: Mar. 11, 2010

(86) PCT No.: PCT/FR2010/050421
§ 371 (c)(1),
(2), (4) Date: Sep. 22, 2011

(87) PCT Pub. No.: WO2010/112721
PCT Pub. Date: Oct. 7, 2010

(65) Prior Publication Data
US 2012/0107720 A1    May 3, 2012

(30) Foreign Application Priority Data

Mar. 30, 2009    (FR) ...................... 09 01540

(51) Int. Cl.
| | | |
|---|---|---|
| C08G 2/00 | (2006.01) |
| C08G 4/00 | (2006.01) |
| C08G 6/00 | (2006.01) |
| C08G 12/02 | (2006.01) |
| C08G 14/02 | (2006.01) |
| C08G 16/02 | (2006.01) |
| B01D 15/00 | (2006.01) |
| B01D 61/00 | (2006.01) |
| B01D 67/00 | (2006.01) |
| B01D 71/52 | (2006.01) |
| B01D 71/62 | (2006.01) |
| C08G 73/06 | (2006.01) |
| C08L 79/00 | (2006.01) |
| C08L 79/04 | (2006.01) |
| C08J 5/22 | (2006.01) |
| C08G 8/28 | (2006.01) |
| C08L 61/00 | (2006.01) |
| B01D 53/22 | (2006.01) |
| B01D 59/12 | (2006.01) |
| C07C 7/144 | (2006.01) |
| H01M 8/02 | (2006.01) |
| C08G 73/00 | (2006.01) |

(52) U.S. Cl.
CPC ............ *B01D 67/0006* (2013.01); *B01D 71/52* (2013.01); *B01D 71/62* (2013.01); *C08G 73/0627* (2013.01); *C08L 79/00* (2013.01); *C08L 79/04* (2013.01); *H01M 8/0291* (2013.01); *Y02E 60/521* (2013.01); *C08G 73/00* (2013.01); *C08J 5/2256* (2013.01)
USPC ........... 528/245; 210/640; 210/650; 210/654; 525/519; 528/211; 95/45; 95/51; 429/492; 585/818

(58) Field of Classification Search
CPC .... B01D 67/0006; B01D 71/52; B01D 71/62; C08G 73/0627; C08L 79/04; C08J 5/2256
See application file for complete search history.

(56) References Cited

FOREIGN PATENT DOCUMENTS

| WO | 0222245 | 3/2002 |
| WO | 2004003044 | 1/2004 |

OTHER PUBLICATIONS

Arnal-Hérault, et al. "Functional G-Quartet Macroscopic Membrane Films", Ang. Chem. Int. Ed., 2007, 46, 8409-8413, Wiley VCH.*
"Poly (Ethylene Oxide-Co-Epichlorohydrin) Membranes for Carbon Dioxide Seperation" J Sanchez et al., 2002.

"Dynamic Polymer Membranes Displaying Tunable Transport Properties on Constitutional Exchange" G Nasr et al., 2008.
"Polymers for Gas Seperations: The Next Decade" S A Stern, 1994.

* cited by examiner

*Primary Examiner* — Nam Nguyen
*Assistant Examiner* — Clare Perrin
(74) *Attorney, Agent, or Firm* — Sofer & Haroun, LLP (57) ABSTRACT

A method of preparation for Self-supporting dynamic polymer membranes (called "dynamer" membranes) of the polyimine type is provided along with their use in separation processes, especially for separating gaseous species.

17 Claims, 4 Drawing Sheets

SELF-SUPPORTING DYNAMIC POLYMER MEMBRANE, AND USES

RELATED APPLICATIONS

This application is a National Phase application of PCT/FR2010/050421, filed on Mar. 11, 2010, which in turn claims the benefit of priority from French Patent Application No. 09 01540 filed on Mar. 30, 2009, the entirety of which are incorporated herein by reference.

BACKGROUND

1. Field of the Invention

The present invention relates to self-supporting dynamic polymer membranes ("dynamer" membranes) of polyimine type, to a process for preparing them and to their use in separation processes, especially for gaseous species.

2. Description of Related Art

Various types of process exist for separating chemical species, such as cryogenics, distillation, solvent absorption (chemical or physical), adsorption and membrane separation.

In the field of separation of gaseous species, in particular in the treatment of natural or synthetic gases, the separation and purification of the components is essential in order to satisfy the increasing needs of the users. Thus, crude natural gas and the derived components must be freed, inter alia, of the carbon dioxide contained by means of an operation known as deacidification.

Among the various separation processes known in the prior art, membrane separation is the least energy intensive and is among the processes that are the most widely used at the industrial level.

Among the membrane processes, the following are distinguished:

processes using microporous inorganic membranes essentially composed of alumina, silica, zeolites or carbon. These processes are efficient, tolerate moderate flows and also high temperatures and pressures, but are expensive. Furthermore, the selectivity factors of inorganic membranes with respect to the chemical species to be separated remain moderate;

processes using polymeric membranes are less expensive in raw material and energy terms. However, the membranes used degrade quickly. The development of organic membranes and their uses for gas separation have been envisioned with the aid of polymers of very varied structures. The majority of the processes industrially used involve membranes manufactured as vitreous polymers, for instance, polyimides, polysulfones and polyphenylene oxides since they generally have greater selectivity and better mechanical properties, but, in counterpart, they accept a smaller separation flow than inorganic membranes since they have insufficient permeability. Other polymers, for instance elastomers such as polysiloxanes, for example, have also been used. They have permeability higher than that of membranes manufactured from vitreous polymers, but are less selective toward the gaseous species to be separated (A. Stern, J. of Membr. Sci., 1994, 94; S. T. Hwang et al., Separation Science, 1974, 9(6)). In general, it has been found that there is an inverse relationship between selectivity and permeability: the better the selectivity, the lower the permeability. Thus, even though membrane processes represent an advance compared with more standard processes, they still need to be improved especially because the membranes used remain expensive and because it is often necessary to make a choice between a high flow (high permeability) and high selectivity.

The selectivity of the polymeric membranes used toward the chemical species to be separated is, moreover, modulable only if the chemical nature and/or the content of the monomers constituting them are varied. Membranes for the selective separation of gases, formed from a copolymer of ethylene oxide (EO) and of epichlorohydrin (EP) have thus already been proposed, in particular in patent application EP 1 322 409, some of the ethylene oxide units possibly being replaced with propylene oxide (PO) units. These membranes are useful in particular for the selective separation of the carbon dioxide ($CO_2$) contained in a gaseous mixture. The best selectivity toward $CO_2$ is obtained with a membrane formed from EO/EP/PO units in proportions of 85/2/13 (mol %). The article by Sanchez J. et al. (Membrane Science, 2002, 205, 259-263) relates a study of the permeability of self-supporting films obtained from crosslinked copolymers of poly(ethylene oxide) (PEO) and of epichlorohydrin. It is indicated therein that it is possible to vary the $CO_2$ permeability properties by varying the PEO/epichlorohydrin (PEO/EP) ratio. The best results are obtained with copolymers containing between 87% and 96% of ethylene oxide units, the maximum $CO_2$ permeability being obtained with a content of 93%.

OBJECTS AND SUMMARY

There is thus a need for polymeric membranes that can be manufactured via a simple and inexpensive process and that afford both high selectivity toward the species that it is desired to separate while at the same time conserving the possibility of working with acceptable flows.

It is also desirable to have available polymeric membranes whose selectivity can be modulated simply without needing to vary the chemical nature and/or the content of the monomers constituting them.

The aim of the present invention is thus to provide organic polymeric membranes that have both high selectivity toward the chemical species to be separated and that can be modulated easily, while at the same time having good permeability, said membranes being able to be prepared via a simple and inexpensive process.

One subject of the present invention is a self-supporting polymeric membrane, characterized in that it is formed from a dynamic polymer formed from repeating units of formula (I) below:

in which:
D represents a subunit of formula ($I_D$) below:

in which:
x is an integer ranging from 10 to 20; and
* is the point of attachment of D to G via an imine bond;
G represents a subunit of formula ($I_G$) below:

($I_G$)

in which:
$R_1$ represents a hydrogen atom or an alkyl radical containing from 1 to 4 carbon atoms,
Y represents a nitrogen atom or C—$R_2$ with $R_2$=H or OH;
# is the point of attachment of G to T via a reversible imine bond;
T represents a subunit of formula ($I_T$) below:

($I_T$)

in which:
$R_3$ represents a hydrogen atom or an alkyl radical containing from 1 to 6 carbon atoms,
$R_4$ and $R_5$, which may be identical or different, represent a hydrogen atom or an alkyl radical containing from 1 to 6 carbon atoms,
n is an integer ranging from 1 to 20,
p is an integer ranging from 1 to 20,
# represents the point of attachment of T to G;
it being understood that said subunits T represent from 20 mol % to 45 mol % relative to the number of moles of subunits G constituting said polymer.

The dynamic polymer defined by the sequence of units of formula (I) above thus has a dendritic structure due to the fact that each of the subunits T is connected to three subunits G.

These membranes have good elastic properties and high thermal stability (about 280° C.). They also have improved $CO_2$ permeability. Moreover, the imine bonds, which are by nature reversible bonds, give the membranes rearrangement, self-distribution and selectivity properties (whence arises the term "dynamic polymer"), which promotes their recycling and is thus environmentally friendly.

Among the alkyl radicals mentioned for the radical $R_1$ of the subunit of formula ($I_G$), mention may be made of methyl, ethyl, n-propyl, n-butyl and t-butyl radicals. According to one preferred embodiment of the invention, $R_1$ represents a t-butyl radical, and even more preferentially a t-butyl radical in the para position relative to Y.

According to one preferred embodiment of the invention, the subunits ($I_G$) are chosen from the subunits ($I_{G1}$) to ($I_{G3}$) below:

($I_{G1}$)

($I_{G2}$)

($I_{G3}$)

it being understood that in the subunit of formula ($I_{G2}$) above, the radical $R_1$ has the same meanings as those indicated above for the subunit ($I_G$). According to one particularly preferred embodiment of the invention, $R_1$ represents a t-butyl radical.

The subunits of formulae ($I_{G2}$) and ($I_{G3}$) have the particular feature of being capable of forming complexes with transition metals that bond reversibly to the species to be separated and facilitate their passage through the membrane.

Thus, according to one particular embodiment of the invention, the polymeric membrane is formed by a polymer formed from repeating units of formula (I) in which the subunit ($I_G$) is a subunit ($I_{G2}$) or ($I_{G3}$) complexing at least one transition metal ion, preferably chosen from Ag(I), Cu(I), Co(II), Fe(II) and Zn(II).

The selectivity of the membrane toward a given species may thus be modulated by varying the nature of the transition metal used (separation of olefins/paraffins with Ag(I) or Cu(I), separation of $N_2$ relative to $O_2$ with Co(II), separation of $CO_2$ with Co(II), Zn(II) or Fe(II), etc.).

Membranes incorporating subunits of this type moreover have permeability and solubility properties that are improved with respect to certain gaseous species such as $CO_2$.

Among the alkyl radicals mentioned for the radicals $R_3$, $R_4$ and $R_5$ of the subunit of formula ($I_T$) above, mention may be made of methyl, ethyl, n-propyl, n-butyl, n-pentyl and n-hexyl radicals. Among these alkyl radicals, the methyl radical is preferred.

According to one preferred embodiment of the invention, the subunit T is chosen from the subunits of formula ($I_T$) in which $R_4$ and $R_5$ are identical and represent a methyl radical.

A subunit T that is most particularly preferred is a subunit of formula ($I_T$) in which the radicals $R_3$, $R_4$ and $R_5$ are identical and represent a methyl radical and n=p.

According to one preferred embodiment of the invention, the subunits T represent from 30 mol % to 38 mol % approximately and even more preferentially 34 mol % approximately relative to the number of moles of subunits G constituting said copolymer.

The self-supporting membrane in accordance with the present invention may have a thickness ranging from 300 to 600 μm approximately and preferably from 200 to 400 μm approximately.

The self-supporting membrane may be produced by polycondensation of precursors of the subunits D, G and T in a refluxing organic solvent medium, and using the various pre- cursors of each of the subunits D, G and T in respective proportions such that the polymer comprises from 20 mol % to 45 mol % of subunits T relative to the number of moles of subunits G.

A subject of the present invention is thus also a process for preparing a self-supporting polymer membrane formed by a dynamic polymer formed from repeating units of formula (I) as defined previously, characterized in that it comprises the following steps:

a) the preparation of a reaction mixture comprising, in solution in at least one organic solvent:
   at least one precursor of a subunit D chosen from the precursors of formula ($I'_D$) below:

in which x' is an integer ranging from 10 to 20;
   at least one precursor of a subunit G chosen from the precursors of formula ($I'_G$) below:

in which Y' represents a nitrogen atom or C—$R'_2$ with $R'_2$=H or OH and $R'_1$ represents a hydrogen atom or an alkyl radical containing from 1 to 4 carbon atoms; and
   at least one precursor of a subunit T chosen from the precursors of formula ($I'_T$) below:

in which:
$R'_3$ represents a hydrogen atom or an alkyl radical containing from 1 to 6 carbon atoms,
$R'_4$ and $R'_5$, which may be identical or different, represent a hydrogen atom or an alkyl radical containing from 1 to 6 carbon atoms,
n' is an integer ranging from 1 to 20,
p' is an integer ranging from 1 to 20,
it being understood that within said reaction mixture, the amount of precursors of formula ($I'_T$) represents from 20 mol % to 45 mol % relative to the number of moles of precursors of formula ($I'_G$) present in said reaction mixture;

b) the polycondensation of said precursors by heating the reaction mixture to reflux to obtain a dynamic polymer formed from repeating units of formula (I) as defined previously;

c) the forming of the membrane and the evaporation of the organic solvent.

The organic solvent of the reaction mixture is preferably chosen from tetrahydrofuran (THF), chloroform and dichloromethane, and mixtures thereof.

According to one preferred embodiment of this process, the solvent(s) used are in anhydrous form.

According to one particular embodiment of this process, the precursor of the subunits G is chosen from the precursors of formulae ($I'_{G2}$) and ($I'_{G3}$) below:

in which $R'_1$ has the same meaning as that indicated above for the subunit ($I'_G$). According to one particularly preferred embodiment of the invention, $R'_1$ represents a t-butyl radical.

In this case, the reaction mixture prepared in step a) then also preferably contains at least one transition metal salt, such that the transition metal ion is complexed with the precursors of formula ($I'_{G2}$) or ($I'_{G3}$) during the polycondensation step b).

According to this embodiment, the salt of a transition metal may be chosen in particular from silver ($Ag^+$), copper ($Cu^+$), cobalt ($Co^{2+}$), iron ($Fe^{2+}$) and zinc ($Zn^{2+}$) salts in which the anion is preferably an acetate, a trifluoromethanesulfonate, a tetrafluoroborate, a hexafluorophosphate, a nitrate or a perchlorate.

When they are used, these salts preferably represent from 0.25 mol to 2 mol per mole of subunits G.

In step b), the polycondensation of the precursors of the various subunits is performed at reflux, over a time that may range from 12 to 24 hours approximately.

When the polycondensation is complete, forming of the membranes may be performed, for example by pouring the reaction medium into a mold having a shape corresponding to the shape of the membrane that it is desired to obtain, or by coating onto a suitable support.

According to one preferred embodiment of this process, in step c), part of the organic solvent(s) of the reaction medium is evaporated off before the forming of the membrane.

This process is simple, reproducible and inexpensive to carry out and leads to the production of the polymer in a yield of 100%. It is ecological insofar as it does not require great energy expenditure and generates only a small amount of water as byproduct of the polycondensation reaction.

The self-supporting membranes of the invention may be used in membrane separation processes, in particular in pervaporation, reverse osmosis, nanofiltration and gas separation processes.

The membranes of the invention are particularly efficient for the selective separation of gaseous mixtures. Membranes in which the polymer comprises subunits of formulae ($I_{G2}$)

and ($I_{G3}$) complexed to a transition metal in particular have improved selectivity and permeability toward certain gaseous species such as $CO_2$. This is why the membranes of the invention, in particular those that are produced with a polymer comprising subunits of formulae ($I_{G2}$) and ($I_{G3}$) complexed to zinc, are of great interest in various industrial fields in which carbon dioxide is involved.

Thus, a subject of the invention is also the use of a self-supporting membrane as defined previously, for the selective separation of chemical species, in particular for the selective separation of gaseous species contained in natural or industrial gases, such as carbon dioxide.

Another subject of the invention is thus a process for separating out a chemical species, and in particular a gaseous species such as carbon dioxide, which consists in passing a gaseous or liquid mixture containing the species that it is desired to separate out through a self-supporting polymer membrane in accordance with the invention and as described previously.

The membranes in accordance with the invention may also be used as polymeric electrolyte for solar cells and fuel cells.

The present invention is illustrated by the following production examples, to which it is not, however, limited.

BRIEF DESCRIPTION OF THE DRAWINGS

The present invention can be best understood through the following description and accompanying drawings, wherein.

DETAILED DESCRIPTION

Examples

The structure of the membranes prepared in the examples that follow was studied by differential scanning calorimetry using a calorimeter sold under the trade name TA Instruments 2920 Modulated DSC by the company Perkin-Elmer.

Infrared (IR) spectroscopy analyses were also performed using a spectrometer sold under the name Nicolet Nexus FTIR/ATR Diamond by the company ThermoFischer.

The determination of the coefficients of permeability and of diffusion of the various membranes was performed by the time-lag method using a frontal permeameter formed from two permeation cells separated by the test membrane. The membrane and the two compartments were first degassed under secondary vacuum for at least 48 hours, using a molecular turbopump with a delivery of 50 $l \cdot s^{-1}$, sold under the trade name Turbovac 50 by the company Leybold. The two compartments were then isolated, followed by introduction of the gas to be studied into the compartment located upstream of the membrane, at a pressure of $3.0 \times 10^5$ Pa, this pressure being higher than the pressure measured in the compartment located downstream of the membrane. The pressure rise in the compartment downstream of the membrane was recorded using a pressure transmitter sold under the trade name Baratron by the company MKS Instruments. This method is based on measurement at constant volume and variable pressure. The curve obtained makes it possible to determine, via resolution of Fick's second law, the coefficient of diffusion during the transient regime and the coefficient of permeability when the pseudostationary regime is reached.

The solubility (S) coefficients of the various membranes were determined using a Cahn-1000 model electrobalance, the functioning of which is based on the principle of gravimetry, sold by the company Cahn (USA).

Example 1

1) Synthesis of Various Membranes Formed from Polymers of Formula (I) and of Comparative Membranes not Forming Part of the Invention The membranes were obtained by polycondensation of the subunits D, G and T, starting with the following precursors:

poly(tetrahydrofuran)bis(3-aminopropyl):

($I'_{D1}$)

in which x is such that the precursor of formula ($I'_{D1}$) has a molecular mass of about 1100 g/mol;

isophthalaldehyde (precursor of the subunit G):

glycerol tris[poly(propylene glycol)]ether containing amine end groups:

(I'$_{T1}$)

in which n=p=17 approximately, such that said precursor of formula (I'$_{T1}$) has a molecular mass of about 3000 g/mol.

Various membranes comprising from 0 to 100 mol % of subunits T relative to the number of motes of subunits G (i.e. t %) were synthesized, the amounts of each of the precursors to be used being calculated as a function of the percentage t of subunit T that it is desired to obtain in the membrane.

Thus, for example, to prepare a membrane containing 34% of subunit T, 2.5 molar equivalents of isophthalaldehyde, i.e. 0.3 g, 2.5 t molar equivalents of precursor of formula (I'$_{T1}$), i.e. 2.281 g for t=34%, and 2.5 (1-t) molar equivalents of precursor of formula (I'$_{D1}$), i.e. 1.624 g for t=34%, were used.

The preparation process is the same irrespective of the percentages of each of the precursors used. The precursors were dissolved in 80 ml of anhydrous tetrahydrofuran (THF). After stirring magnetically overnight at reflux, the reaction mixture was evaporated to half its initial volume (40 ml). 6.7 ml of reaction mixture was poured into a Teflon Petri dish 3.7 cm in diameter placed on a levelling plate. Next, the device was covered with a filter paper to slow down the evaporation and thus to limit the creation of air bubbles. After 4 to 5 days, when the evaporation of the solvent was complete, the films were placed in an oven under vacuum at 70° C. for a further two days of drying.

The following membranes were thus prepared, the molar percentages of subunits D and T of which (expressed relative to the number of moles of subunits G) are given in Table 1 below:

TABLE 1

| Membranes | Copolymer composition (mol % relative to the number of moles of subunit G) | |
|---|---|---|
| | (I'$_{D1}$) | (I'$_{T1}$) |
| GD * | 100 | 0 |
| GDT$_{6.5}$ * | 93.5 | 6.5 |
| GDT$_{11}$ * | 89 | 11 |
| GDT$_{22.2}$ | 77.8 | 22.2 |
| GDT$_{24}$ | 76 | 24 |
| GDT$_{34}$ | 66 | 34 |
| GDT$_{43}$ | 57 | 43 |
| GDT$_{47}$ * | 53 | 47 |
| GDT$_{51}$ * | 49 | 51 |
| GDT$_{70}$ * | 30 | 70 |
| GT$_{100}$ * | 0 | 100 |

* Comparative membrane not forming part of the invention since it contains less than 20 mol % or more than 45 mol % of subunits T relative to the number of moles of subunits G.

The exact composition of subunits D and T was determined from the $^1$H-NMR spectra by calculating the number of protons corresponding to the methyl group of the subunit T, the peak of which is located at about 1 ppm.

The spectroscopic data for each of the membranes thus prepared were as follows:

GD (*): $^1$H-NMR (300 MHz, CDCl$_3$): 8.3 (br, 2H, CH═N); 8.0 (br, 1H, CH-2); 7.7 (br, 2H, CH-3); 7.4 (br, 1H, CH-4); 3.7 (br, 4H, CH-7); 3.5 (br, 58H, CH-8.5); 2 (br, 4H, CH-6); 1.5 (br, 54H, CH-9).

GD

GDT$_{6.5}$ (*): $^1$H-NMR (300 MHz, CDCl$_3$): 8.25 (s, 2H, CH═N); 7.96 (s, 1H, CH-2); 7.71 (d, 2H, CH-3); 7.37 (t, 1H, CH-4); 3.3-3.8 (m, 64H, CH-5.7.8.10.11.13.14.15); 1.92 (t, 4H, CH-6); 1.65 (br, 49H, CH-9); 1.2 (m, 9.7H, CH-12).

GDT$_{11}$ (*): $^1$H-NMR (300 MHz, CDCl$_3$): 8.22 (s, 2H, CH=N); 7.93 (s, 1H, CH-2); 7.67 (d, 2H, CH-3); 7.34 (t, 1H, CH-4); 3.2-3.75 (m, 72H, CH-5.7.8.10.11.13.14.15); 1.90 (m, 4H, CH-6); 1.56 (br, 47H, CH-9); 1.05 (m, 17H, CH-12).

GDT$_{22}$: $^1$H-NMR (300 MHz, CDCl$_3$): 8.28 (s, 2H, CH=N); 7.96 (s, 1H, CH-2); 7.72 (d, 2H, CH-3); 7.37 (t, 1H, CH-4); 3.14-3.66 (m, 82H, CH-5.7.8.10.11.13.14.15); 1.89 (m, 4H, CH-6); 1.56 (br, 41H, CH-9); 1.05 (m, 30.6H, CH-12).

GDT$_{24}$: $^1$H-NMR (300 MHz, CDCl$_3$): 8.25 (s, 2H, CH=N); 7.96 (s, 1H, CH-2); 7.72 (d, 2H, CH-3); 7.36 (m, 1H, CH-4); 3.34-3.65 (m, 84H, CH-5.7.8.10.11.13.14.15); 1.88 (t, 4H, CH-6); 1.56 (br, 40H, CH-9); 1.05 (m, 37H, CH-12).

GDT$_{34}$: $^1$H-NMR (300 MHz, CDCl$_3$): 8.33 (d, 2H, CH=N); 8.02 (s, 1H, CH-2); 7.78 (d, 2H, CH-3); 7.44 (m, 1H, CH-4); 3.40-3.75 (m, 93H, CH-5.7.8.10.11.13.14.15); 1.90 (m, 4H, CH-6); 1.65 (br, 34H, CH-9); 1.10 (m, 52H, CH-12).

GDT$_{43}$: $^1$H-NMR (300 MHz, CDCl$_3$): 8.35 (d, 2H, CH=N); 8.04 (s, 1H, CH-2); 7.80 (d, 2H, CH-3); 7.46 (m, 1H, CH-4); 3.45-3.79 (m, 102H, CH-5.7.8.10.11.13.14.15); 1.93 (m, 4H, CH-6); 1.66 (br, 30H, CH-9); 1.12 (m, 66H, CH-12).

GDT$_{47}$ (*): $^1$H-NMR (300 MHz, CDCl$_3$): 8.36 (d, 2H, CH=N); 8.02 (s, 1H, CH-2); 7.78 (d, 2H, CH-3); 7.42 (m, 1H, CH-4); 3.40-3.76 (m, 106H, CH-5.7.8.10.11.13.14.15); 1.94 (m, 4H, CH-6); 1.60 (br, 27H, CH-9); 1.12 (m, 72H, CH-12).

GDT$_{51}$ (*): $^1$H-NMR (300 MHz, CDCl$_3$): 8.24 (d, 2H, CH=N); 7.95 (s, 1H, CH-2); 7.44 (d, 2H, CH-3); 7.37 (m, 1H, CH-4); 3.32-3.96 (m, 110H, CH-5.7.8.10.11.13.14.15); 1.90 (m, 4H, CH-6); 1.60 (br, 25H, CH-9); 1.12 (m, 78H, CH-12).

GDT$_{70}$ (*): $^1$H-NMR (300 MHz, CDCl$_3$): 8.27 (s, 2H, CH=N); 7.96 (s, 1H, CH-2); 7.47 (d, 2H, CH-3); 7.39 (m, 1H, CH-4); 3.36-3.98 (m, 129H, CH-5.7.8.10.11.13.14.15); 1.90 (m, 4H, CH-6); 1.60 (br, 16H, CH-9); 1.12 (m, 107H, CH-12).

GT$_{100}$ (*): $^1$H-NMR (300 MHz, CDCl$_3$): 8.3 (d, 2H, CH=N); 8.0 (s, 1H, CH-2); 7.7 (d, 2H, CH-3); 7.4 (t, 1H, CH-4); 3.3-3.8 (m, 158H, CH-5, 7, 8, 9, 10); 1.1 (m, 153H, CH-6).

The differential scanning calorimetry analyses reveal that the polymers constituting the membranes are elastomers that have glass transition temperatures of between −72.03 and 61.67° C. (1$^{st}$ cycle).

The glass transition temperatures (Tg, 1$^{st}$ and 2$^{nd}$ cycle), the crystallization temperature (Tc) and the melting point (Tm) of some of the membranes prepared in this example are given in Table 2 below:

TABLE 2

| Mem-branes | Tg (° C.) | | Tc (° C.) | | Tm (° C.) | |
| --- | --- | --- | --- | --- | --- | --- |
| | 1$^{st}$ cycle | 2$^{nd}$ cycle | 1$^{st}$ cycle | 2$^{nd}$ cycle | 1$^{st}$ cycle | 2$^{nd}$ cycle |
| GD * | −65.68 | −65.28 | — | — | 10.73 | 13.28 |
| GDT$_{6.5}$ * | −72.03 | −63.31 | −31.55 | — | 9.27 | 11.10 |
| GDT$_{11}$ * | −69.51 | −68.25 | −10.05 | −30.13 | 5.01 | 4.64 |
| GDT$_{22.2}$ | −68.88 | −67.62 | −16.22 | −26.99 | 6.07 | 6.76 |
| GDT$_{34}$ | −65.73 | −64.46 | −14.09 | −25.79 | 7.23 | 10.04 |
| GDT$_{47}$ * | −102.62 | −102.62 | | | | |
| | −64.27 | −64.27 | −12.33 | −17.88 | 6.54 | 4.92 |
| | 87.59 | 88.60 | | | | |
| GDT$_{70}$ * | −61.31 | −60.68 | — | — | — | — |
| GT$_{100}$ * | −101.67 | −102.30 | | | 19.12 | |
| | −61.67 | −61.94 | — | −10.51 | 37.47 | 9.66 |
| | 96.35 | | | | | |

Figure 1:
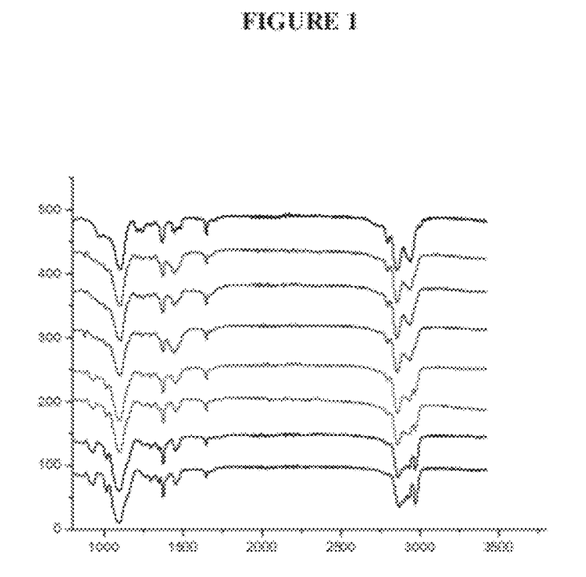
FIG. 1 is a an IR spectra of some of the membranes of example 1, in accordance with one embodiment.

The attached FIG. 1 shows the IR spectra of some of the membranes prepared in this example. In this figure, the transmittance expressed in arbitrary units is a function of the wavelength expressed in cm$^{-1}$. Starting from the upper curve, the various curves correspond, in this order, to the IR spectra of the following membranes: GD, GDT$_{6.5}$, GDT$_{11}$, GDT$_{22.2}$, GDT$_{34}$, GDT$_{51}$, GDT$_{70}$, GT$_{100}$.

These results demonstrate the presence of the vibration bands for the ether groups vCH$_2$—O—CH$_2$=1100 cm$^{-1}$, imine vCH=N=1600 cm$^{-1}$ and alkyl groups vCH$_{2.3}$=2800-3000 cm$^{-1}$.

2) Study of the Gas Transport Properties of the Synthesized Membranes

Two measurements were performed to characterize the gas transport properties of the membranes synthesized in this example, i.e. membranes with different contents of subunit T.

Determination of the coefficients of permeability and of diffusion and determination of the solubility (S) coefficients.

Figure 2:
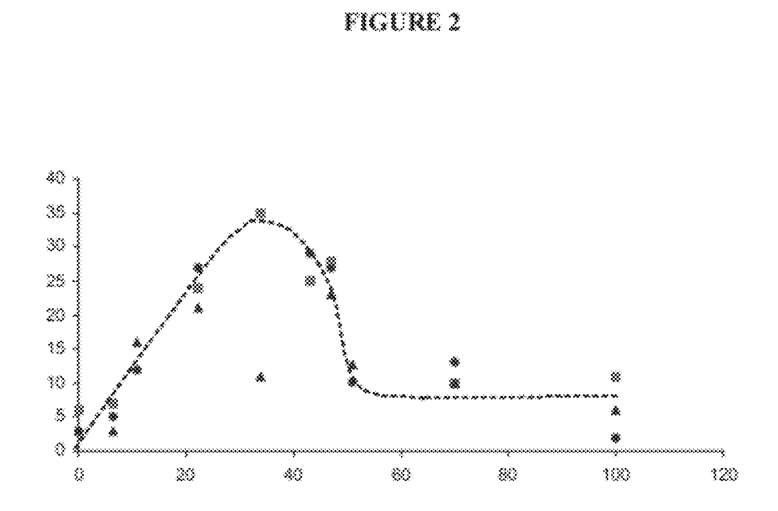
FIG. 2 is a chart showing the change in permeability coefficients (Barrer) of the membranes toward helium (He: solid squares), nitrogen ($N_2$: solid triangles) and oxygen ($O_2$: solid circles), as a function of the content of subunit T (in mol %) relating to example 1, in accordance with one embodiment.

The attached FIG. 2 shows the change in permeability coefficients (Barrer) of the membranes toward helium (He: solid squares), nitrogen (N$_2$: solid triangles) and oxygen (O$_2$: solid circles), as a function of the content of subunit T (in mol %).

The bell-shaped curve shows an increase in permeabilities for the three gases studied up to a content of subunits T of 34 mol %, followed by a decrease at higher values. The membranes in accordance with the present invention, i.e. in which the content of subunits T ranges from 20 mol % to 40 mol % relative to the number of moles of subunits G, have the best permeability properties.

Figure 3:
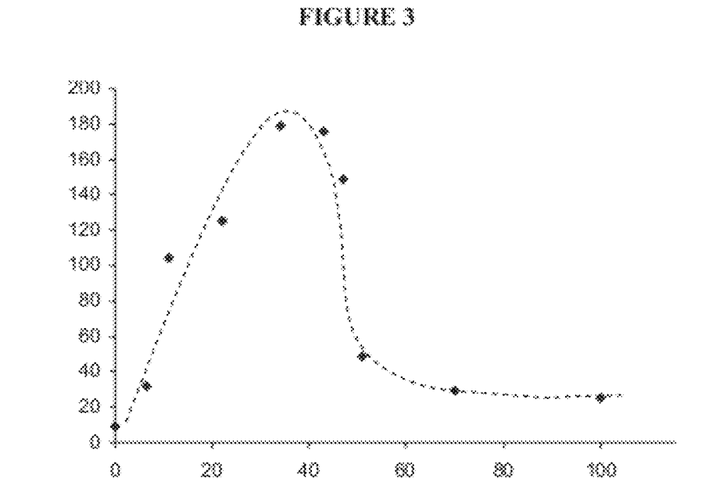
FIG. 3 is a chart showing the change in permeability coefficients (Barrer) of the membranes toward carbon dioxide, as a function of the content of subunit T (in mol %) relating to example 1, in accordance with one embodiment.

The attached FIG. 3 shows the change in permeability coefficients (Barrer) of the membranes toward carbon dioxide, as a function of the content of subunit T (in mol %). The best results are also obtained with the membranes in accordance with the present invention, i.e. in which the content of subunits T ranges from 20 mol % to 40 mol % relative to the number of moles of subunits G, the maximum permeability being obtained with the membrane in which the content of subunit T is 34 mol % approximately.

Figure 4:
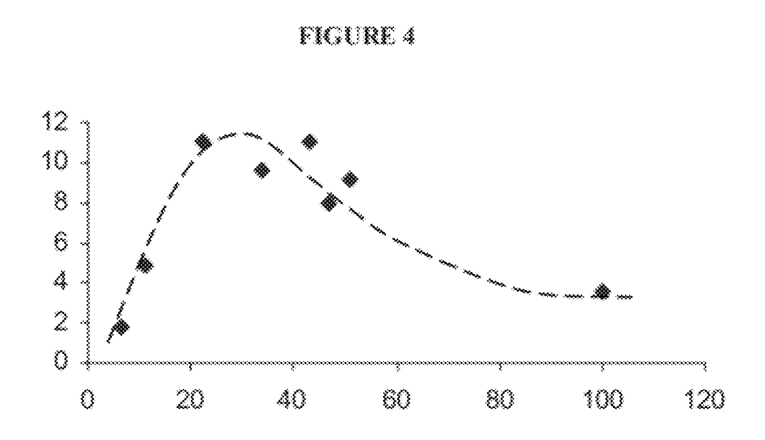
FIG. 4 is a chart showing the change in the carbon dioxide diffusion coefficients ($D_{CO2}$), determined by the "time-lag" method, in which $D_{CO2}$ ($10^{-7} \cdot cm^2 \cdot s^{-1}$) is expressed as a function of the content of subunit T (in mol %) relating to example 1, in accordance with one embodiment.

The change in the carbon dioxide diffusion coefficients ($D_{CO2}$), determined by the "time-lag" method, is shown in the attached FIG. 4, in which $D_{CO2}$ ($10^{-7} \cdot cm^2 \ s^{-1}$) is expressed as a function of the content of subunit T (in mol %). The curve obtained is also bell-shaped, showing that the best results are obtained with the membranes in accordance with the present invention, i.e. the membranes in which the content of subunit T ranges from 20 mol % to 45 mol % relative to the number of moles of subunits G, with a maximum at 34 mol % approximately.

The solubility parameters in the global $CO_2$ permeability were evaluated by measuring the mass of $CO_2$ absorbed using a Cahn balance for a few membranes at different contents of subunit ($GDT_{6.5}$, $GDT_{11}$, $GDT_{22.2}$, $GDT_{34}$ and $GDT_{51}$).

Figure 5:
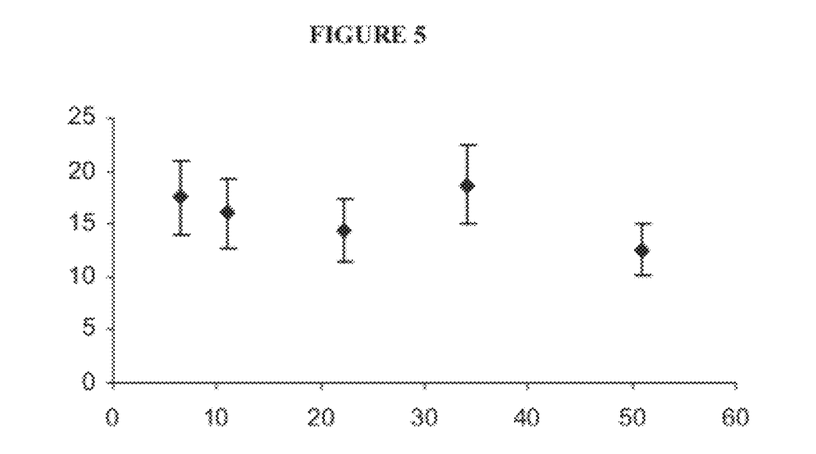
FIG. 5 is a chart showing the coefficient of sorption of $CO_2$ (S $CO_2$ $10^{-3} \cdot cm^3$ (STP)$\cdot cm^{-1}$) is a function of the content of subunit T (in mol %) relating to example 1, in accordance with one embodiment.

The results obtained are shown in the attached FIG. 5, in which the coefficient of sorption of $CO_2$ (S $CO_2$ $10^{-3} \cdot cm^3$ (STP)·$cm^{-1}$) is a function of the content of subunit T (in mol %).

These results show that the change in the coefficient of $CO_2$ sorption appears to be linear with a very slight decreasing tendency ($GDT_{51}$). The coefficients of the gas transport parameters are linked via the relationship Pe=D×S in which Pe is the coefficient of permeability, D is the coefficient of diffusion and S is the coefficient of selectivity. This indicates that the diffusive factor is the main factor that controls the $CO_2$ permeability.

Figure 6:
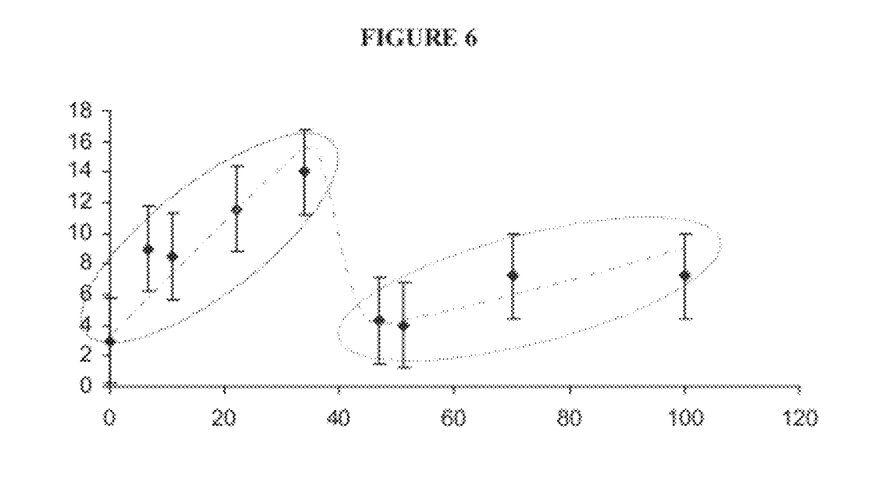
FIG. 6 is a chart showing the permeability of the membranes toward $CO_2$ relative to the permeability of the membranes toward nitrogen ($CO_2/N_2$ selective permeability or "permselectivity") relating to example 1, in accordance with one embodiment.

The attached FIG. 6 shows the permeability of the membranes toward $CO_2$ relative to the permeability of the membranes toward nitrogen ($CO_2/N_2$ selective permeability or "permselectivity"). In this figure, the $CO_2/N_2$ selective permeability ratio is a function of the content of subunits T (in mol %).

These results show that the $CO_2/N_2$ permselectivity increases from GD to $GDT_{34}$ and then falls for the membranes with higher contents of subunits T.

Example 2

1) Synthesis of a Membrane with a Content of 24 mol % of Subunit T (Relative to the Number of Moles of Subunit G) in the Presence of a Zinc Salt The membrane was obtained by polycondensation of the subunits D, G and T, using the following precursors:

poly(tetrahydrofuran)bis(3-aminopropyl):

(I'$_{D1}$)

in which x is such that the precursor of formula (I'$_{D1}$) has a molecular mass of about 1100 g/mol;

5-tert-butyl-2-hydroxybenzene-1,3-dicarbaldehyde (precursor of the subunit G):

glycerol tris[poly(propylene glycol)]ether containing amine end groups:

(I'$_{T1}$)

in which n=p=17 approximately, such that said precursor of formula (I'$_{T1}$) has a molecular mass of about 3000 g/mol.

The polycondensation of the subunits was performed according to the process detailed above in Example 1, using 2.5 molar equivalents of 5-tert-butyl-2-hydroxybenzene-1,3-dicarbaldehyde, i.e. 0.4 g, 0.6 molar equivalent of precursor of formula (I'$_{T1}$), i.e. 1.39 g for t=24 mol %, and 1.9 molar equivalents of precursor of formula (I'$_{D1}$), i.e. 1.62 g for t=24 mol %, in 300 ml of THF also containing 1 molar equivalent, i.e. 0.14 g, of zinc acetate. The membrane thus obtained was named $GDT_{24}$ $Zn^{2+}$.

A similar membrane, i.e. a membrane prepared from the same precursors in identical amounts, was prepared in THF, but in the absence of zinc acetate. The membrane thus obtained was named $GDT_{24}$.

2) Structure of the Membranes $GDT_{24}Zn^{2+}$ and $GDT_{24}$

The membranes were subjected to analysis by X-ray diffraction (XRD), using a high-resolution diffractometer sold under the name X'Pert PRO by the company PANalytical with Cu radiation ($\lambda$=1.5405 Å) using an Ni filter. The scattered radiation was collected on a one-dimension collector sold under the name X'Celerator by the company PANalytical. The distance from the detector to the membrane sample was 240 mm.

Figure 7:
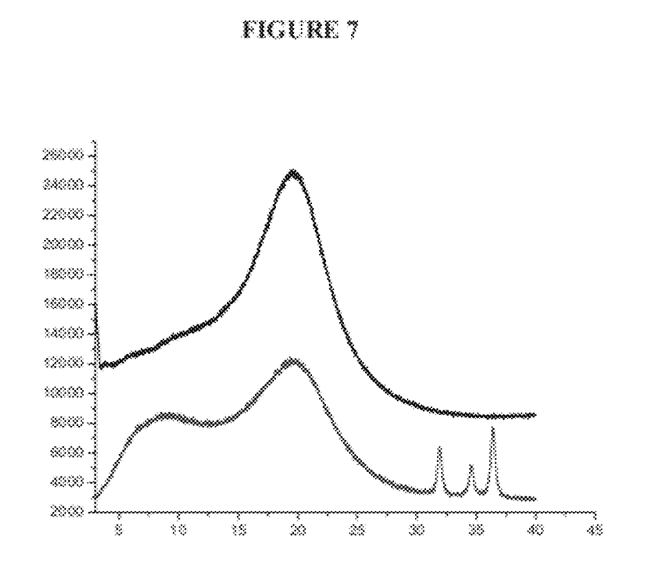
FIG. 7 is a chart showing the diffraction spectrum of the membranes $GDT_{24}$ $Zn^{2+}$ and $GDT_{24}$, on which the intensity (expressed as arbitrary units) is a function of the diffraction angle in degrees relating to example 2, in accordance with one embodiment.

The attached FIG. 7 shows the diffraction spectrum of the membranes $GDT_{24}$ $Zn^{2+}$ and $GDT_{24}$, on which the intensity (expressed as arbitrary units) is a function of the diffraction angle in degrees. In this figure, the top curve corresponds to the spectrum for the membrane $GDT_{24}$, while the bottom curve corresponds to that of the membrane $GDT_{24}$ $Zn^{2+}$. These diffractograms reveal the appearance of new peaks showing a certain level of organisation of the structure at short distance within the amorphous polymer $GDT_{24}$ $Zn^{2+}$. The nuclear magnetic resonance (not shown) reveals the formation of complexes between the subunits T and $Zn^{2+}$ by shifting of the proton, imine and aromatic peaks.

The structure of the membranes thus prepared was studied by differential scanning calorimetry using a calorimeter sold under the reference TA Instruments 2920 Modulated DSC by the company Perkin-Elmer.

The calorimetric analyses show a decrease in the glass transition temperature due to the crosslinking created by the formation of the polymer complexes:

$GDT_{24}$: Tg=−64.46° C.
$GDT_{24} Zn^{2+}$: −60.42° C.

The coefficients of permeability (Pe) of these two membranes toward He, $N_2$, and $CO_2$, and also their relative $CO_2$/He and $CO_2/N_2$ permeabilities, were measured and are reported in Table 3 below:

TABLE 3

| | Pe (Barrer) | |
|---|---|---|
| Gas | $GDT_{24}$ | $GDT_{24} Zn^{2+}$ |
| He | 14 | 33 |
| $N_2$ | 14 | 15 |
| $CO_2$ | 125 | 167 |
| $CO_2$/He | 8.9 | 5.1 |
| $CO_2/N_2$ | 8.9 | 11.1 |

Table 4 below collates the coefficients of permeability, of $CO_2$ diffusion ($D_{CO2}$), of solubility (S) and the "time lag" for each of the two membranes:

TABLE 4

| Membrane | Pe (Barrer) | "Time-lag" (s) | $D_{CO2}$ $(10^{-7}$ $cm^2 \cdot s^{-1})$ | $S_{time-lag} 10^{-3}$ $(cm^3(STP)cm^3 \cdot$ $cm^{-1}{}_{Hg})$ |
|---|---|---|---|---|
| $GDT_{24}$ | 125 | 676 | 6.16 | 20 |
| $GDT_{24} Zn^{2+}$ | 167 | 1166 | 2.29 | 73 |

These results as a whole demonstrate that the presence of zinc leads to an increase in the permeability and selectivity of the membrane, most particularly toward carbon dioxide.

The invention claimed is:

1. A self-supporting polymeric membrane, wherein said self-supporting polymeric membrane is formed from a dynamic polymer formed from repeating units of formula (I) below:

(I)

in which:
D represents a subunit of formula ($I_D$) below:

($I_D$)

in which:
x is an integer ranging from 10 to 20; and
* is the point of attachment of D to G via an imine bond;

G represents a subunit of formula ($I_G$) below:

($I_G$)

in which:
$R_1$ represents a hydrogen atom or an alkyl radical containing from 1 to 4 carbon atoms, Y represents a nitrogen atom or C—$R_2$ with $R_2$=H or OH;

# is the point of attachment of G to T via a reversible imine bond;

T represents a subunit of formula ($I_T$) below:

($I_T$)

in which:
$R_3$ represents a hydrogen atom or an alkyl radical containing from 1 to 6 carbon atoms, $R_4$ and $R_5$, which may be identical or different, represent a hydrogen atom or an alkyl radical containing from 1 to 6 carbon atoms, n is an integer ranging from 1 to 20, p is an integer ranging from 1 to 20, # represents the point of attachment of T to G;

it being understood that said subunits T represent from 20 mol % to 45 mol % relative to the number of moles of subunits G constituting said dynamic polymer.

2. The self-supporting polymeric membrane as claimed in claim 1, wherein the alkyl radicals mentioned for the radical $R_1$ of the subunit of formula ($I_G$) are chosen from the group consisting of methyl, ethyl, n-propyl, n-butyl and t-butyl radicals.

3. The self-supporting polymeric membrane as claimed in claim 2, wherein the radical $R_1$ of the subunit of formula ($I_G$) is a t-butyl radical in the para position relative to Y.

4. The self-supporting polymeric membrane as claimed in claim 1, wherein the subunit ($I_G$) is chosen from the subunits ($I_{G1}$) to ($I_{G3}$) below:

($I_{G1}$)

-continued (I$_{G2}$)

(I$_{G3}$)

it being understood that in the subunit of formula (I$_{G2}$), the radical R$_1$ has the same meanings as those indicated in claim 1 for the subunit (I$_G$).

5. The self-supporting polymeric membrane as claimed in claim 4, wherein in the subunit of formula (I$_{G2}$), the radical R$_1$ is a t-butyl radical.

6. The self-supporting polymeric membrane as claimed in claim 4, wherein the membrane is formed by the dynamic polymer formed from repeating units of formula (I) in which the subunit (I$_G$) is a subunit (I$_{G2}$) or (I$_{G3}$) that complexes at least one transition metal ion.

7. The self-supporting polymeric membrane as claimed in claim 6, wherein the transition metal ion is chosen from the group consisting of Ag(I), Cu(I), Co(II), Fe(II) and Zn(II).

8. The self-supporting polymeric membrane as claimed in claim 1, wherein the subunit T is chosen from the subunits of formula (I$_T$) in which R$_4$ and R$_5$ are identical and represent a methyl radical.

9. The self-supporting polymeric membrane as claimed in claim 1, wherein the subunit T is a subunit of formula (I$_T$) in which the radicals R$_3$, R$_4$ and R$_5$ are identical and represent a methyl radical and n=p.

10. The self-supporting polymeric membrane as claimed in claim 1, wherein the subunits T represent from 30 mol % to 38 mol % relative to the number of moles of subunits G constituting said dynamic polymer.

11. The self-supporting polymeric membrane as claimed in claim 10, wherein the subunits T represent 34 mol % relative to the number of moles of subunits G constituting said dynamic polymer.

12. The self-supporting polymeric membrane as claimed in claim 1, wherein the membrane has a thickness ranging from 300 to 600 µm.

13. The self-supporting polymeric membrane as claimed claim 1, wherein said self-supporting polymeric membrane is formulated sufficient for selective separation of chemical species.

14. The self-supporting polymeric membrane as claimed in claim 13, wherein said self-supporting polymeric membrane is formulated sufficient for selective separation of gaseous species contained in natural or industrial gases.

15. The self-supporting polymeric membrane as claimed in claim 14, wherein said self-supporting polymeric membrane is formulated sufficient for selective separation of carbon dioxide.

16. The self-supporting polymeric membrane as claimed in claim 1, wherein said self-supporting polymeric membrane is formulated sufficient for separating out a chemical species via passing a gaseous or liquid mixture containing the species that it is desired to separate out through said membrane.

17. The self-supporting polymeric membrane as claimed in claim 1, wherein said self-supporting polymeric membrane is formulated sufficient to be a polymer electrolyte for solar cells and fuel cells.

* * * * *